(12) United States Patent
Lin

(10) Patent No.: US 6,717,384 B2
(45) Date of Patent: Apr. 6, 2004

(54) FREQUENCY CHANGER PROTECTION CIRCUIT FOR CONTROLLING THE ACCELERATION OF AN ELECTRIC VEHICLE

(75) Inventor: Angel Lin, Kaohsiung (TW)

(73) Assignee: Kentfa Electric Motorbike Corporation (TW)

( * ) Notice: Subject to any disclaimer, the term of this patent is extended or adjusted under 35 U.S.C. 154(b) by 21 days.

(21) Appl. No.: 10/191,543

(22) Filed: Jul. 10, 2002

(65) Prior Publication Data
US 2004/0008978 A1 Jan. 15, 2004

(51) Int. Cl.[7] .................................................. H02P 5/34
(52) U.S. Cl. ...................... 318/807; 318/798; 318/799; 318/800; 388/814; 361/1; 361/23; 361/31; 361/78; 361/87; 363/39
(58) Field of Search ................................ 318/807, 798, 318/799, 800; 388/814; 361/1, 23, 31, 78, 87; 363/39

(56) References Cited

U.S. PATENT DOCUMENTS

| | | | | |
|---|---|---|---|---|
| 4,066,934 A | * | 1/1978 | Waldorf et al. | 318/139 |
| 4,090,114 A | * | 5/1978 | Thompson | 318/139 |
| 4,162,436 A | * | 7/1979 | Waldorf et al. | 318/139 |
| 4,191,914 A | * | 3/1980 | Lecluse | 318/139 |
| 5,574,352 A | * | 11/1996 | Endo et al. | 318/802 |
| 5,731,669 A | * | 3/1998 | Shimizu et al. | 318/139 |
| 6,324,038 B1 | * | 11/2001 | Kishibe et al. | 361/31 |

* cited by examiner

Primary Examiner—Rita Leykin
(74) Attorney, Agent, or Firm—Birch, Stewart, Kolasch & Birch, LLP

(57) ABSTRACT

A frequency regulator protection circuit for controlling acceleration of electric vehicle comprises a power unit, a display unit, a protection unit, a control unit, a sensor unit, a data processor unit, a trigger unit, a regulator unit, and an output unit. The control unit receives a rotation speed signal from a motor. The sensor unit detects whether there is a current overload and delivers a corresponding overload signal to the data processor unit that consequently outputs a frequency change signal to the trigger unit which, in turn, delivers a first regulation signal to the regulator unit. The output unit further delivers a second regulation signal to the regulator unit, corresponding to different situations of insufficiency of pedal control, brake control, over-speed control, or motor overload. The regulator unit consequently effectuates an adequate cutoff of power supply.

12 Claims, 8 Drawing Sheets

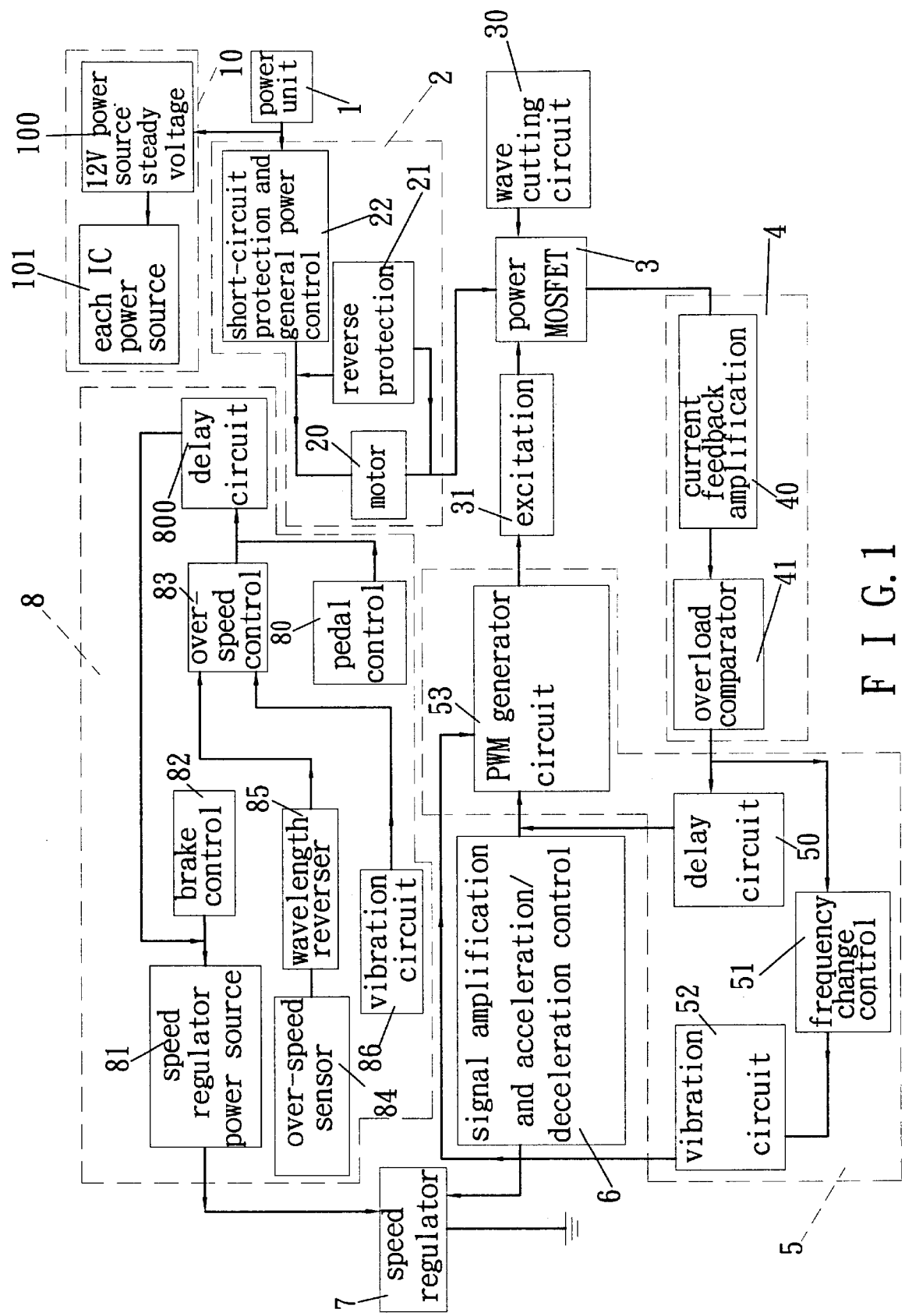
F I G. 1

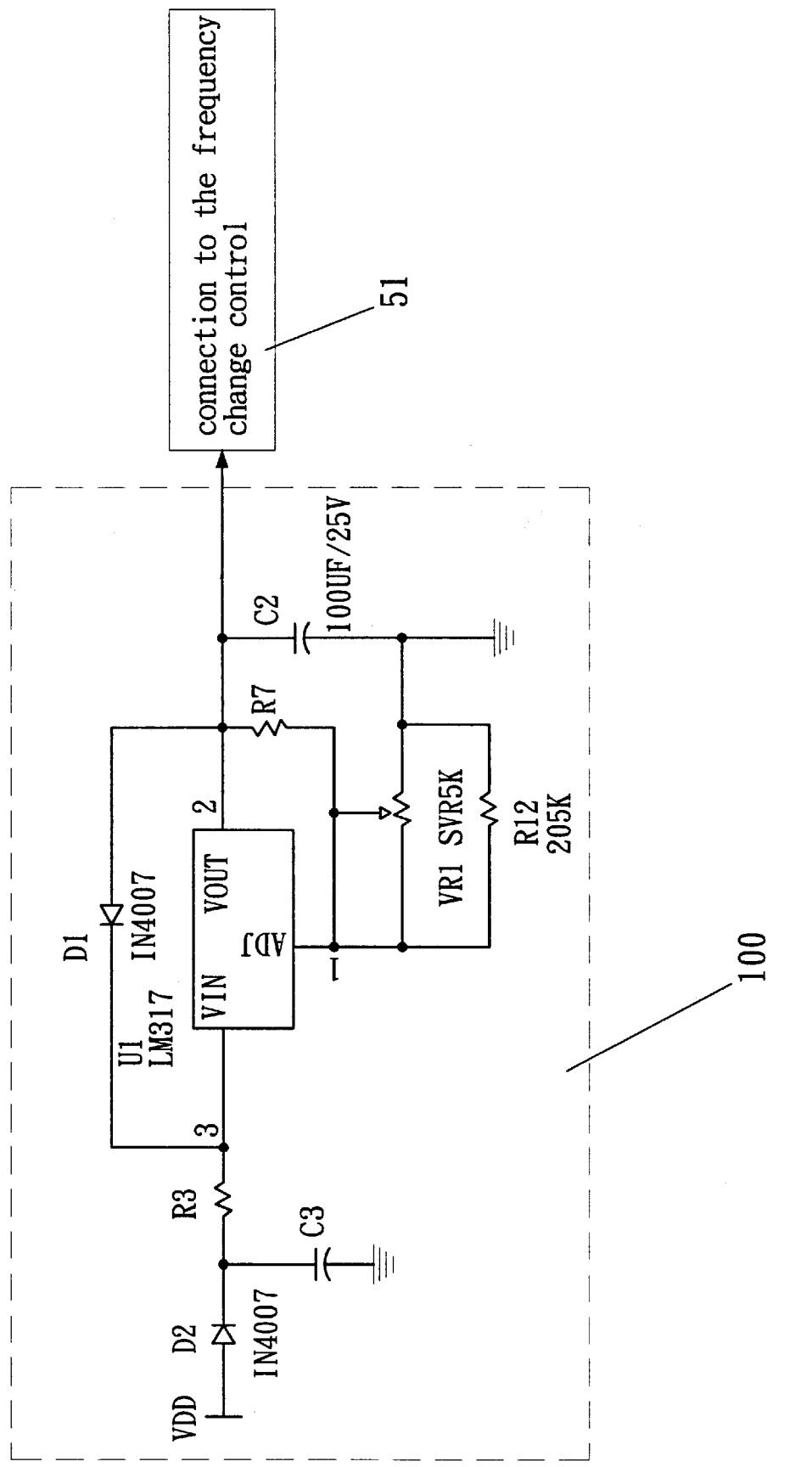
F I G. 3

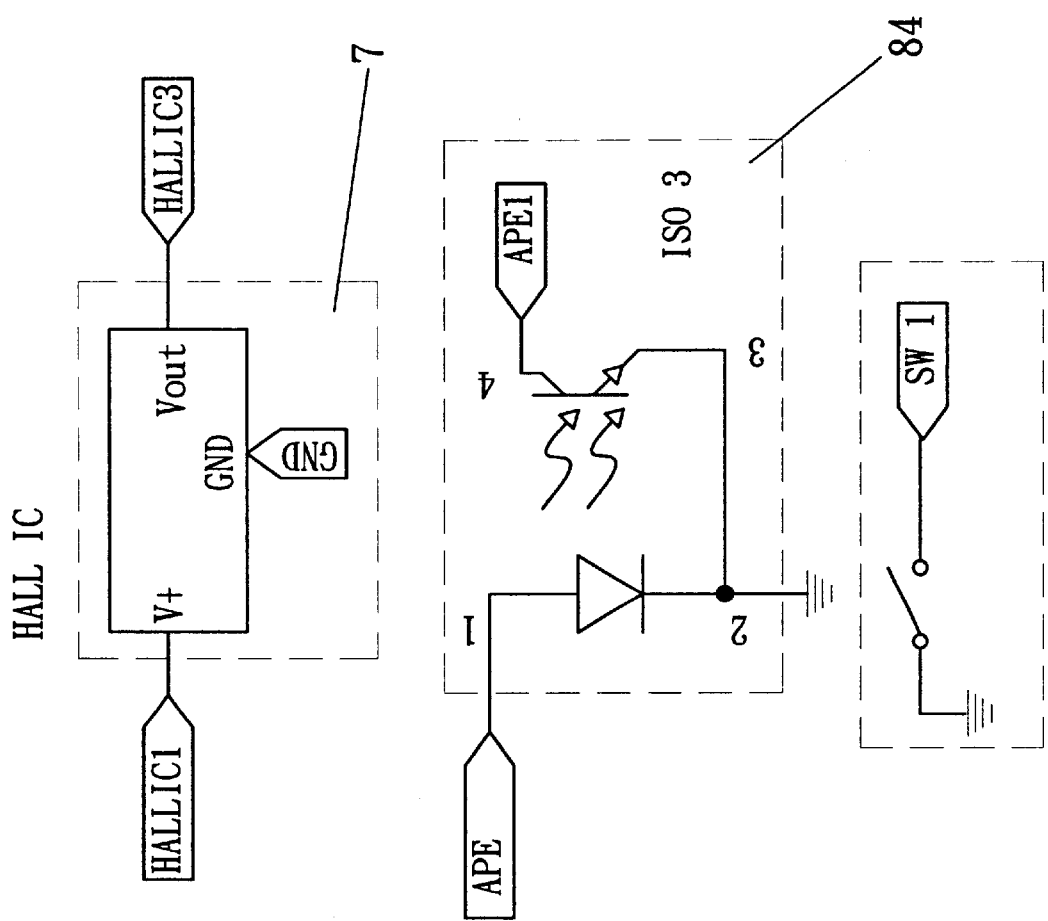
F I G. 6

FREQUENCY CHANGER PROTECTION CIRCUIT FOR CONTROLLING THE ACCELERATION OF AN ELECTRIC VEHICLE

FIELD OF THE INVENTION

The invention relates to a frequency changer protection circuit for controlling the acceleration of an electric vehicle. More particularly, the protection circuit enables to protect the motor and reduce current losses during the acceleration operation of the electric vehicle.

BACKGROUND OF THE INVENTION

The control of electrically-driven (or electric) vehicles is presently achieved via simple control and protection circuits which time constant is usually excessively high to provide an adequate reaction. In critical situations such as motor starting or slope climbing, the control circuit can be damaged. In other situations when the acceleration control is not sufficient, a needed power may be increased or the acceleration may be instable.

SUMMARY OF THE INVENTION

It is therefore a principal object of the invention to provide a frequency changer protection circuit for controlling the acceleration of an electric vehicle that can overcome the above problems.

In accordance with the above and other objectives, the protection circuit of the invention arranges specific amplification curves with a sensor unit to render safer and more comfortable the control of the speed rate change of the motor during acceleration operations, meanwhile reducing current losses. A protection of the electric circuitry is thereby favorably achieved.

In accordance with the above and other objectives, the protection circuit of the invention further includes a control unit that automatically limits the outputted power to a maximum normal rated power of the motor, thereby protecting the motor and the control circuit meanwhile reducing losses of power during motor starting. The endurance of the motor is thereby increased.

In accordance with the above and other objectives, meanwhile achieving a limitation of the outputted power, the protection circuit of the invention further increases a frequency so as to increase the rotation speed of the motor, useful in motor starting and slope climbing.

To provide a further understanding of the invention, the following detailed description illustrates embodiments and examples of the invention, this detailed description being provided only for illustration of the invention.

BRIEF DESCRIPTION OF THE DRAWINGS

The drawings included herein provide a further understanding of the invention. A brief introduction of the drawings is as follows:

FIG. 1 is a block diagram of a protection circuit according to an embodiment of the invention;

FIG. 3 is a circuit diagram representing a connection scheme the display unit according to an embodiment of the invention;

FIG. 6 is a circuit diagram representing a connection scheme of the speed regulator, the over-speed sensor, and the pedal switch according to embodiment of the invention;

DETAILED DESCRIPTION OF THE EMBODIMENTS

Figure 2:
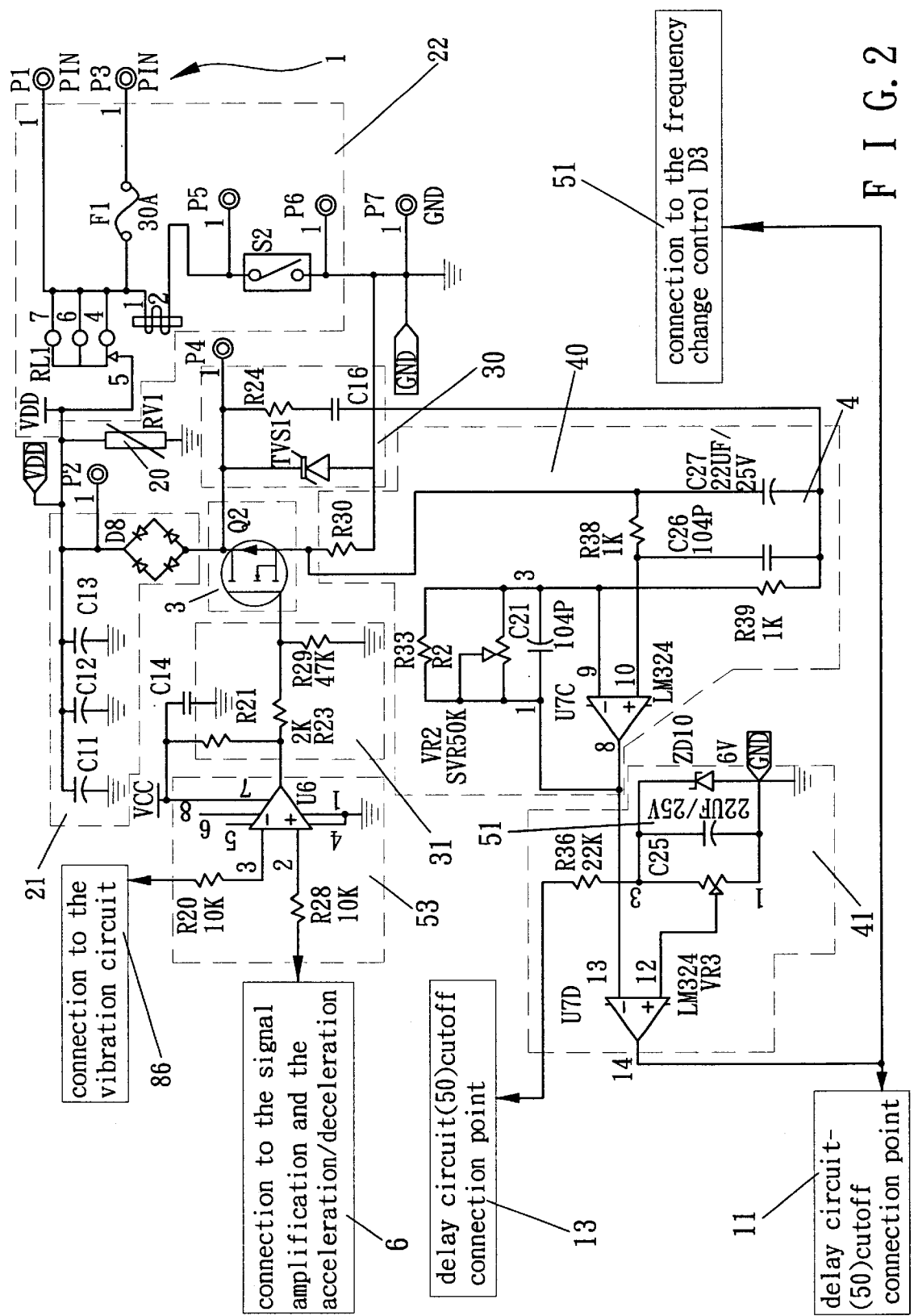
FIG. 2 is a circuit diagram representing a connection scheme of the power unit, the protection unit, the control unit, and the sensor unit according to an embodiment of the invention.

Wherever possible in the following description, like reference numerals will refer to like elements and parts unless otherwise illustrated.

Figure 4:
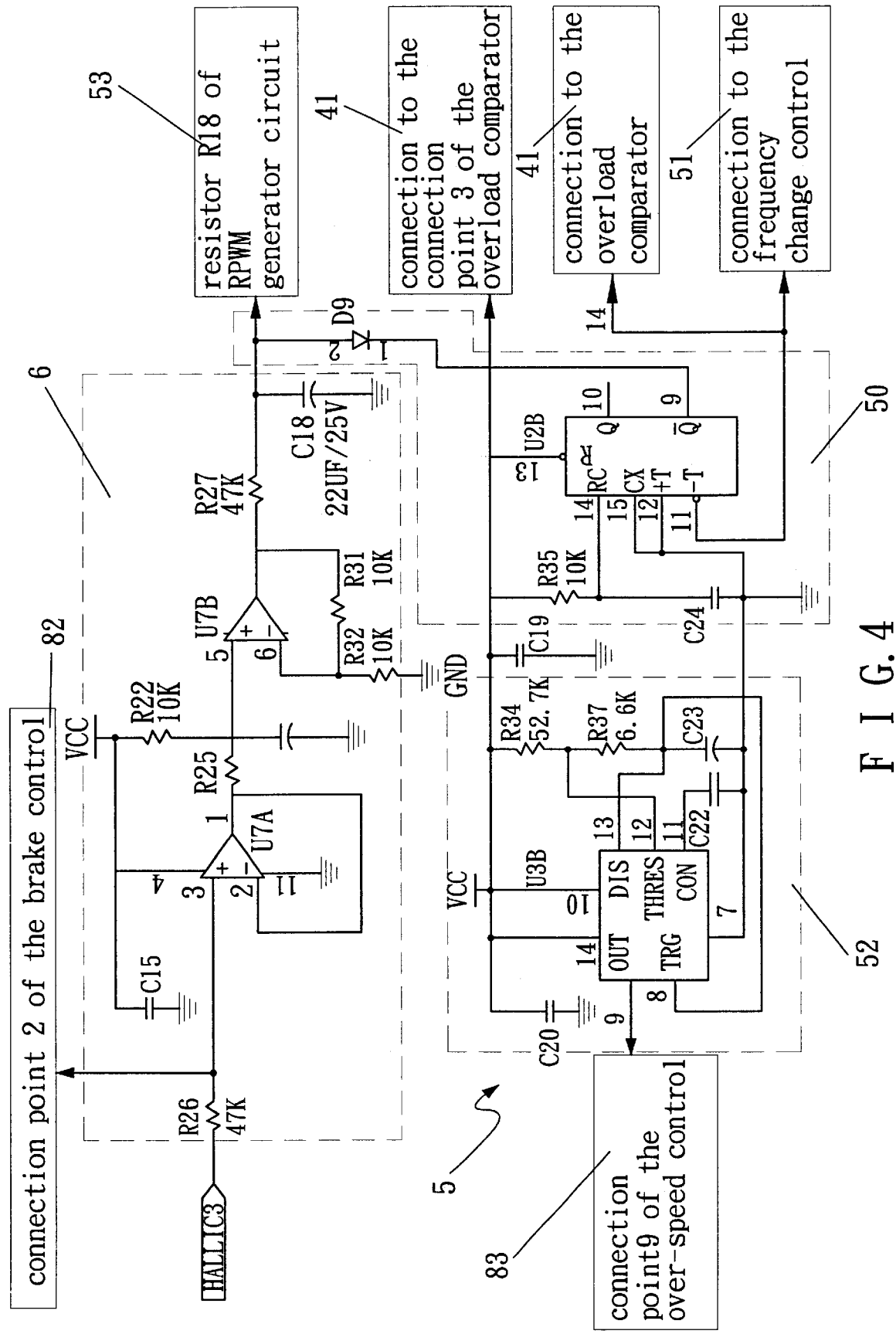
FIG. 4 is a circuit diagram representing a connection scheme of the data processor unit and the trigger unit according to an embodiment of the invention.
Figure 5:
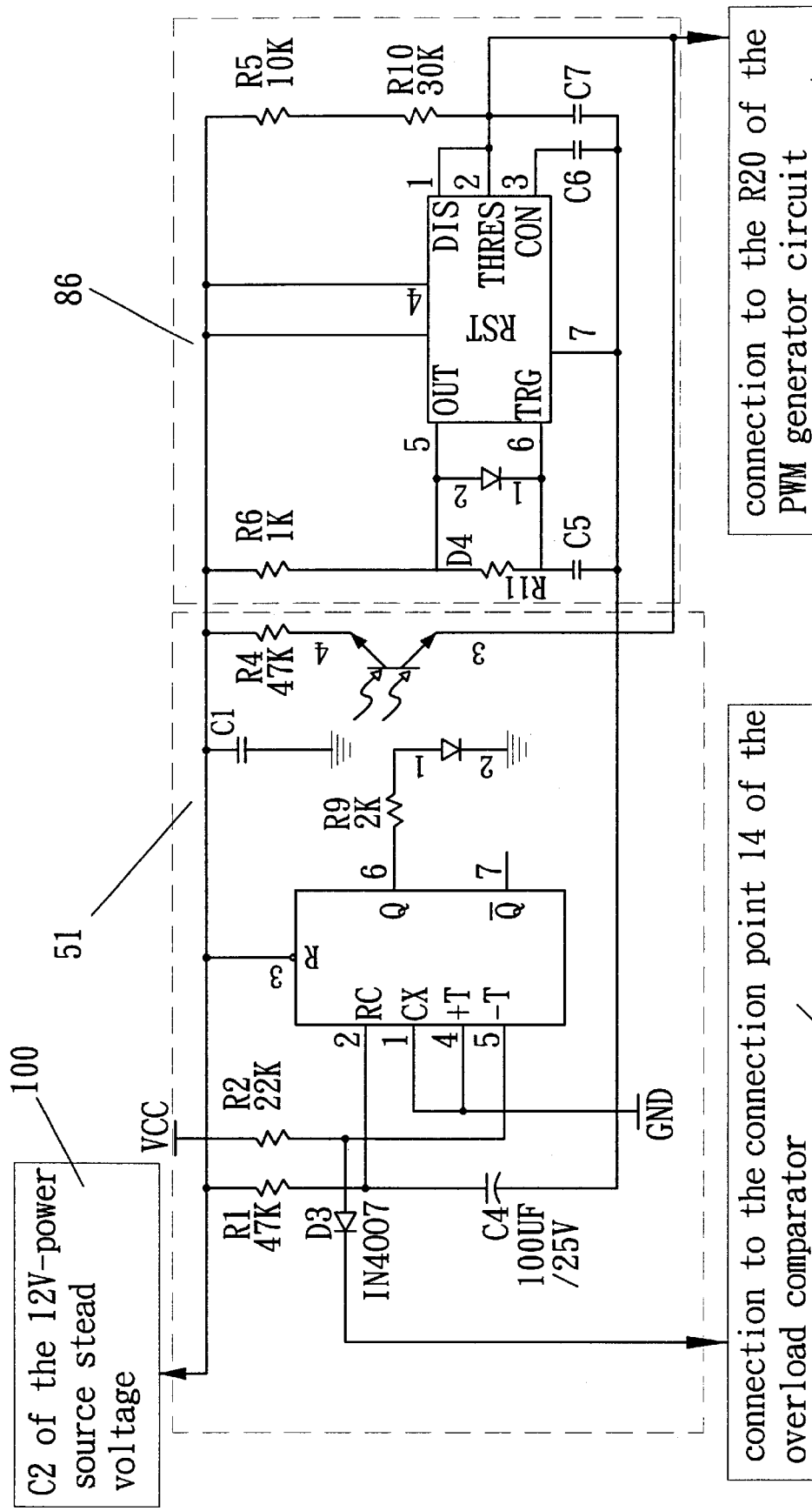
FIG. 5 is a circuit diagram representing a connection scheme of the frequency change control circuit and the vibration circuit according an embodiment of the invention.
Figure 7:
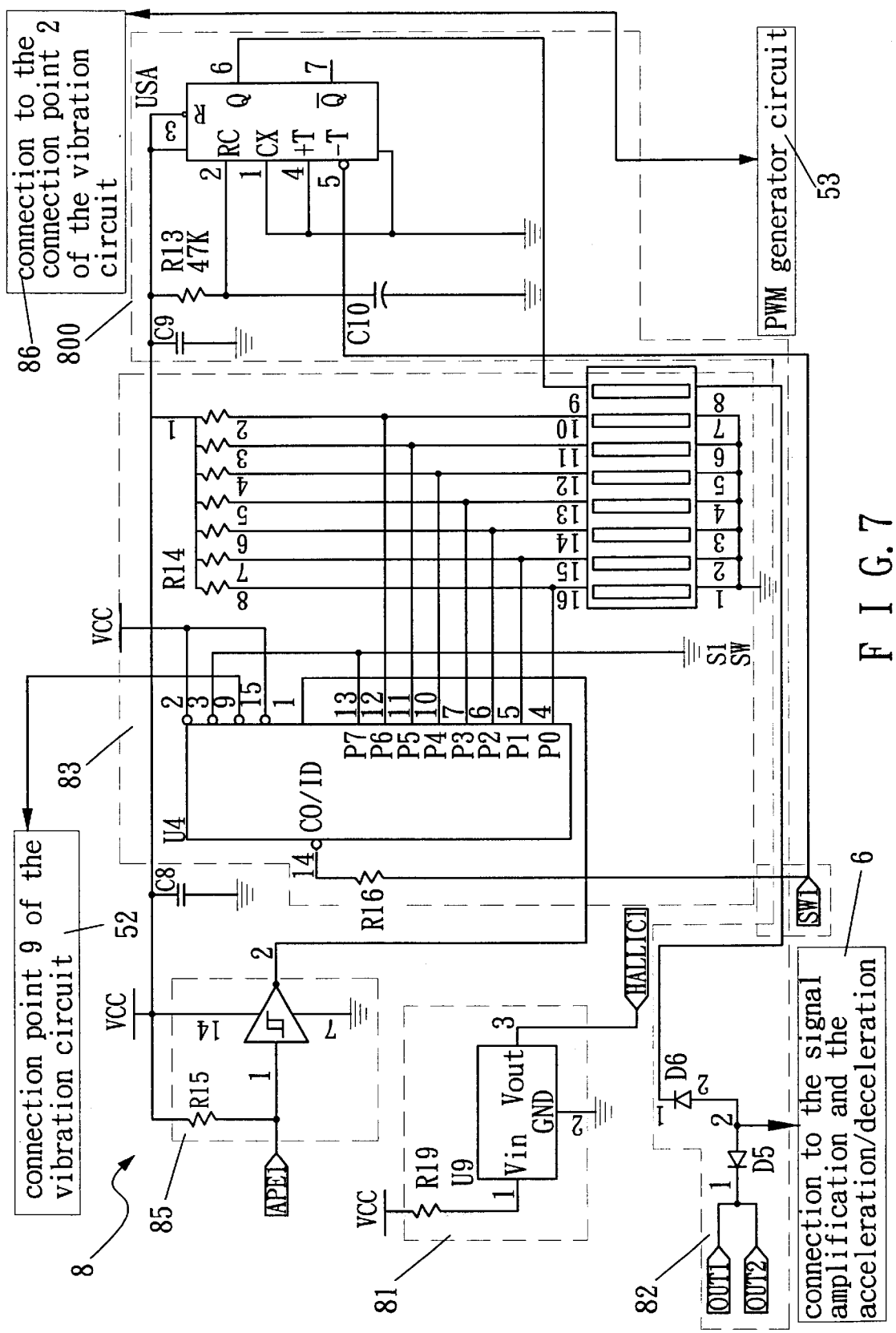
FIG. 7 is a circuit diagram representing a connection scheme of the output unit according to an embodiment of the invention.
Figure 8:
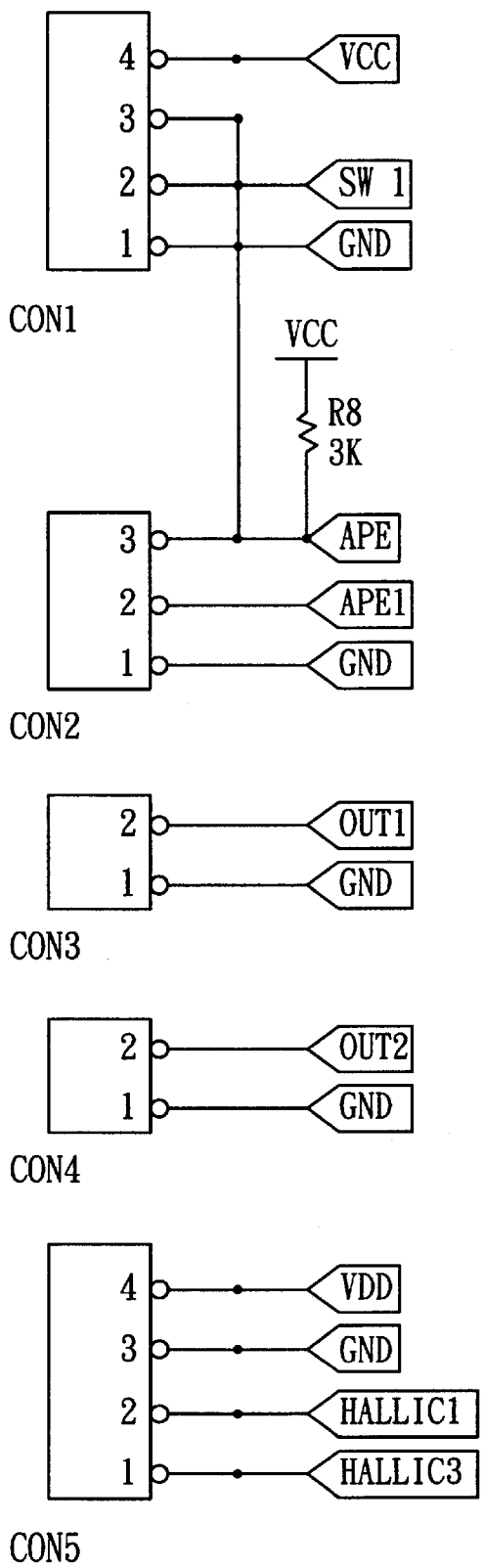
FIG. 8 is a schematic drawing illustrating a switch arrangement according to an embodiment of the invention.

FIG. 1 is a block diagram that schematically illustrates an embodiment of the invention. FIG. 2 through FIG. 8 are circuit diagrams that illustrate the circuitry of the different elements shown in FIG. 1. As illustrated in FIG. 1, the circuit of the invention comprises a power unit 1, a display unit 10, a protection unit 2, a control unit 3, a sensor unit 4, a data processor unit 5, a trigger unit 6, a regulator unit 7, and an output unit 8.

The power unit 1 outputs a direct voltage that is respectively delivered to the display unit 10 and, via fuses and a relay, to a motor 20 of the protection unit 2.

The display unit 10 is connected to an output of the power unit 1, and displays a power steady voltage 100 and each IC power source 101.

The protection unit 2 is respectively formed from a reverse diode that, as a commutator, is coupled with two terminals of the motor 20, and a short-circuit protection and general controller 22. The protection unit 2 is connected to an output of the power unit 1 to be supplied with a direct voltage.

The control unit 3 is formed from a power MOSFET that has its source and drain connected parallel to a wave cutter and a RC circuit ($100\Omega+0.1\mu$). The control unit 3 respectively receives a signal of a rotation speed from the motor 2, and input signals from a wave cutter circuit 30 and from an excitation 31 of a PWM generator circuit 53 of the data processor unit 5. Damages due to bounce within the circuit are thereby prevented.

The sensor unit 4 has a circuitry that can be formed from an optico-electric transistor, and is connected to an output of the control unit 3 to supply a voltage of 5V. An output of the sensor unit 4 delivers an electric signal that is a pair voltage that has been specifically amplified (for example, when the accelerator is actuated, a steady voltage of 3.4V of the output of the sensor unit 4 is increased to 8.4V). This output of the sensor unit 4 is compared to a signal from a triangular wave generator to control the power MOSFET. This control is further achieved via a feedback voltage (above 0.5V) that, after amplification, is delivered to comparator 41.

The data processor unit 5 is comprised of a delay circuit 50, a frequency change controller circuit 51, and a vibration circuit 52. The data processor unit 5 is connected to an output of an overload comparator 41 of the sensor unit 4. Thereby, the data processor unit 5 receives a sensing signal from the sensor unit 4 via the comparator 41, and processes this sensing signal. The resulting processed signal is delivered to a PWM generator circuit 53 to control and adjust a maximum output current. While a current overload hence is being controlled, a signal outputted from the comparator 41 is delivered via the delay circuit 50 to the vibration circuit 52 to increase the vibration frequency of the triangular wave. The rotation speed of the motor 20, via this frequency change, is consequently increased.

The trigger unit 6 is connected to an output of the delay circuit 50 of the data processor unit 5. The trigger unit 6 receives a signal processed from the data processor unit 5. As described above, this processing corresponds to a signal amplification and an acceleration/deceleration control process. The signal received by the trigger unit 6 is outputted to the regulator unit 7.

The regulator unit 7 is a speed regulator connected to respective outputs of the trigger unit 6 and output unit 8. The regulator unit 7 displays the signals outputted from the trigger unit 6, and effectuates a regulation from command signals from the output unit 8.

The output unit 8 is comprised of a pedal control unit 80 that is connected to the delay circuit 800. Via the actuation of a magnetic-spring switch (not shown), the control unit 80 turns off the power supply from a speed regulator power source 81 (for example 5V) if no signal change occurs within 3 seconds.

The output unit 8 further includes a brake control unit 82. Via a connection of the power source 81 to the magnetic-spring switch (not shown), the brake control unit 82 turns off the power supply when a braking action is effectuated.

The output unit 8 further includes an over-speed control unit 83 and an over-speed sensor 84 formed from an optico-electric transistor. When an over-speed occurs, a signal from the optico-electric transistor of the over-speed sensor 84 has its waveform commutated via a reverser 85 to be subsequently delivered to a calculating circuit, thereby cutting off the power supply from the speed regulator power source 81. Alternatively, the cutoff of the power supply from the power source 81 can be achieved via the delivery of a signal through the vibrating circuit 86 to the over-speed control circuit 83.

In conditions when the motor is overloaded, such as starting or slope climbing, the control unit 3 automatically limits the outputted power to a maximum normal rated value. The motor and the general electric circuit are thereby protected, and power losses at starting the motor are reduced, which increases its endurance.

While limiting the outputted power, the frequency is further simultaneously increased, resulting in an increase of the rotation speed of the motor, which assists the electric vehicle in starting and climbing slope.

Before receiving the speed rate of the motor 20, the control unit 3 therefore arranges specific amplification curves with the sensor unit 4 (via an optico-electric transistor) to render safer and more comfortable the control of the speed rate change of the motor 20 during acceleration operations, meanwhile reducing current losses. A protection of the electric circuitry is thereby favorably achieved.

The device of the invention as described above is operated in the following manner.

1. pedal control: if pushing of the pedal is stopped within 3 seconds, the outputted power is cut off.

2. brake control: when a braking action is effectuated, the driven power source is automatically cut off temporarily, power losses is thereby prevented.

3. over-speed control: via an optico-electric switching, the invention can control the vehicle speed at about 30 km/h and can automatically stop supplying temporarily driven power.

4. failure power cut-off: when a failure occurs, the power supplied from the general power source is cut off.

5. limit control: the invention can control a maximum outputted power of the electrical vehicle by a regulation to a maximum normal rated power.

6. frequency change control: while performing a limiting and controlling operation, the invention can simultaneously perform a frequency changing operation that increases the rotation speed of the motor.

7. wave cutting circuit: the invention can limit circuit bounces, thereby protecting the power MOSFET from damages.

8. protection against motor reverse voltage: the invention prevents damages of the motor and the electric circuit caused from a reverse voltage that is generated by the motor.

9. control of the power source of the speed regulator: via an optico-electric switching manner, the invention controls the speed regulator power supply.

10. controls of the signal amplification and acceleration/deceleration: the invention arranges specific amplification curves with the PWM generator circuit to control the optimal speed rate change.

In conclusion, the invention as described above overcomes the conventional problems of insufficient protection against motor overload, which usually results in insufficient strength in starting and slope climbing.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A frequency regulator protection circuit for controlling the acceleration of an electric vehicle, comprising
   a power unit;
   a display unit connected to the power unit and displaying a plurality of IC power sources;
   a protection unit connected to a motor and to the power unit to be supplied with power;
   a control unit connected to the motor and to the data processor unit, the control unit receiving a signal of rotation speed from the motor;
   a sensor unit connected to the control unit, the sensor unit detecting a current overload and outputting a corresponding overload signal;
   a data processor unit comprised of a delay circuit, a frequency change control circuit, and a vibration circuit, the data processor unit receiving the overload signal from the sensor unit and outputting a corresponding frequency change signal;
   a trigger unit connected to the data processor unit to receive the frequency change signal, and outputting a first regulation signal;
   an output unit receiving inputted signals indicating an insufficiency of pedal control, brake control, over-speed control, or motor overload control, and outputting a corresponding second regulation signal; and
   a regulator unit connected to the trigger unit and the output unit to receive the first and second regulation signals and consequently achieves a corresponding power cutoff to provide an adequate power for motor starting or slope climbing.

2. The protection circuit of claim 1, wherein the power unit outputs a direct voltage that is delivered to the display unit and via fuses and a relay to the motor.

3. The protection circuit of claim 1, wherein the display unit is connected to an output of the power unit to display power steady voltages and each IC power source.

4. The protection circuit of claim 1, wherein the protection unit is respectively formed from a reverse diode that, as a commutator, is coupled with two terminals of the motor, and a short-circuit protection and general controller, the protection unit being connected to an output of the power unit to be supplied with a direct voltage.

5. The protection circuit of claim 1, wherein the control unit is formed from a power MOSFET that has its source and drain connected parallel to a wave cutter and a RC circuit, the control unit respectively receiving a signal of a rotation speed from the motor, and input signals from a wave cutter circuit and from an excitation of a PWM generator circuit of the data processor unit.

6. The protection circuit of claim 1, wherein the sensor unit has a circuitry that can be formed from an optico-electric transistor, and is connected to an output of the control unit to provide a voltage supply.

7. The protection circuit of claim 1, wherein the data processor unit is comprised of a delay circuit, a frequency change controller circuit, and a vibration circuit, the data processor unit being connected to an output of an overload comparator of the sensor unit, receiving a sensing signal there from, and processing this sensing signal, a resulting processed signal being delivered to a PWM generator circuit.

8. The protection circuit of claim 1, wherein the trigger unit is connected to an output of the delay circuit of the data processor unit, the trigger unit receiving a signal processed from the data processor unit, which corresponds to a signal amplification and an acceleration/deceleration control process, the signal received by the trigger unit then being outputted to the regulator unit.

9. The protection circuit of claim 1, wherein the regulator unit is a speed regulator connected to respective outputs of the trigger unit and output unit, the regulator unit displaying the signals outputted from the trigger unit, and effectuating a regulation from command signals from the output unit.

10. The protection circuit of claim 1, wherein the output unit is comprised of a pedal control unit that is connected to a delay circuit through which an output signal is delivered via the actuation of a magnetic-spring switch.

11. The protection circuit of claim 10, wherein the output unit further includes a brake control unit that, via the magnetic-spring switch, directly controls the speed regulator power supply.

12. The protection circuit of claim 1, wherein the output unit further includes an over-speed control unit and an over-speed sensor formed from an optico-electric transistor, wherein when an over-speed occurs, a cutoff of the power supply from the power source is achieved either via a signal from the optico-electric transistor of the over-speed sensor that has its waveform commutated via a reverser to be subsequently delivered to a calculating circuit, via the delivery of a signal through the vibration circuit to the over-speed control circuit.

* * * * *